(12) United States Patent
Johnston et al.

(10) Patent No.: US 6,430,867 B1
(45) Date of Patent: Aug. 13, 2002

(54) DIRECTIONALLY CONTROLLABLE FISHING LURE

(76) Inventors: Jon C. Johnston, 1210 Poplar Ave., Hollidaysburg, PA (US) 16648; Thomas J. Shaffer, 1222 Creekside Dr., Altoona, PA (US) 16601

( * ) Notice: Subject to any disclaimer, the term of this patent is extended or adjusted under 35 U.S.C. 154(b) by 0 days.

(21) Appl. No.: 09/665,927

(22) Filed: Sep. 20, 2000

Related U.S. Application Data

(60) Provisional application No. 60/155,056, filed on Sep. 21, 1999.

(51) Int. Cl.$^7$ ................................................ A01K 85/00
(52) U.S. Cl. .................... 43/42.45; 43/42.22; 43/42.23; 43/42.39
(58) Field of Search ............................ 43/42.22, 42.23, 43/42.39, 42.45, 42.48

(56) References Cited

U.S. PATENT DOCUMENTS

| | | | |
|---|---|---|---|
| 1,239,956 A | | 9/1917 | Phinney |
| 1,394,313 A | | 10/1921 | Leeper |
| 1,807,283 A | | 5/1931 | Dick |
| 2,134,330 A | * | 10/1938 | Fink ............................ 43/42.22 |
| 2,159,591 A | | 5/1939 | Leusch et al. |
| 2,270,488 A | | 1/1942 | Withey |
| 2,274,596 A | | 2/1942 | Fink |
| 2,498,800 A | * | 2/1950 | Fehely ........................ 43/42.45 |
| 2,565,205 A | | 8/1951 | Culver |
| 2,714,779 A | | 8/1955 | Heiner |
| 2,817,180 A | * | 12/1957 | Thomas ...................... 43/42.23 |
| 2,817,181 A | | 12/1957 | Bartlett |
| 2,875,549 A | * | 3/1959 | O'Sullivan .................. 43/42.22 |
| 3,264,775 A | * | 8/1966 | Nahigian .................. 433/42.45 |
| 3,507,070 A | | 4/1970 | Rossello |
| 3,676,948 A | * | 7/1972 | Hill ............................ 43/42.45 |
| 4,164,826 A | | 8/1979 | Metzler et al. |
| 4,602,452 A | | 7/1986 | Reid |
| 4,881,340 A | * | 11/1989 | Davis ........................ 43/42.06 |
| 5,537,770 A | | 7/1996 | Storm et al. |
| 5,638,632 A | | 6/1997 | Smith |

FOREIGN PATENT DOCUMENTS

| | | | | |
|---|---|---|---|---|
| CA | 672568 | * | 10/1963 | ............... 43/42.23 |
| CA | 677357 | | 1/1964 | |
| GB | 590568 | | 7/1947 | |

* cited by examiner

Primary Examiner—Kurt Rowan
(74) Attorney, Agent, or Firm—Richard C. Litman

(57) ABSTRACT

A directionally controllable fishing lure enables an angler to cast the lure to a desired area, with the lure traveling an arcuate path to the left or right upon retrieval. The direction of turn is determined by the angler, depending upon the rigging of the lure. The present lure has an elongate body with angularly truncated faces at each end thereof. The two faces are angled in opposite directions to one another, and the lure body is ballasted so that the two faces are always angled to one side when the lure is floating in the water, rather than facing upwardly or downwardly. The angularly truncated ends produce an asymmetrical hydrodynamic reaction as the lure is drawn through the water, causing the lure to turn in one direction or the other. If the angler attaches the fishing leader or line to the first end, the lure will travel in an arcuate path to the angler's right (or to the left, when considered in the direction of travel of the lure). Attaching the line or leader to the opposite end, results in a turn in the opposite direction. Thus, the present lure may be made to work around snags, weeds, and other obstructions, and/or may be made to work upstream in a current. The arcuate retrieve path is also much more realistic than the straight retrieval path of other lures, thus attracting fish more readily due to the realistic travel path of the present lure.

9 Claims, 3 Drawing Sheets

DIRECTIONALLY CONTROLLABLE FISHING LURE

CROSS-REFERENCE TO RELATED APPLICATION

This application claims the benefit of U.S. Provisional Patent Application Ser. No. 60/155,056, filed Sep. 21, 1999.

BACKGROUND OF THE INVENTION

1. Field of the Invention

The present invention relates generally to lures and other attractive devices for fish and game, and more specifically to a buoyant fishing lure which is directionally controllable by the angler using the lure.

2. Description of the Related Art

Sport fishing is a tremendously popular pastime for many people, with new equipment and variations upon such equipment being developed regularly in attempts to maximize the efficiency of attracting and catching various species of fish. Fishing lures are probably the most commonly developed and refined articles of fishing equipment, with various types of lures having been developed which mimic the appearance or action of various types of prey (minnows, insects, etc.), and/or provide various colors, motions, reflectivity, sounds, etc., which are believed to attract various species of fish under various environments and conditions.

One nearly universal attribute of these various fishing lures of the prior art, is that they are laterally symmetrical, with recovery of the lure after casting resulting in the lure returning in an essentially straight line back to the angler, or more precisely to the tip of the angler's fishing rod. While external conditions (e.g., surface wind, tide and/or current, etc.) may affect the path of the lure, these external factors are not controllable by the angler. For example, a lure cast and retrieved across a current flowing from left to right (relative to the angler), will consistently drift toward the angler's right during retrieval of the lure; the angler has no control over this drift.

Some lures provide some lateral movement through the water, relative to the direction of retrieval. Lures simulating "cripple" minnows, for example, may produce some variable lateral movement to the left and right relative to the retrieval path. However, the result is a random, meandering path, with no control over the precise path of the lure being available to the angler.

This can be a major problem in sport fishing for small game fish, as oftentimes such fish are found in areas with snags, weeds, and other obstructions between the angler and the desired location of the lure cast. Conventional lures having an essentially straight return path to the angler, will be drawn through such obstructions and are nearly certain to snag upon the obstructions. As a result, some prime fishing spots are precluded from access to anglers, due to such obstructions and the near certainty of losing the lure.

Also, a study of smaller prey fish, insects, etc. which are common food for smaller game fish (bass, etc.) will show that they generally do not maintain a given direction of travel through or over the water for any appreciable time or distance. An object traveling straight through the water is often dismissed by fish which would otherwise be attracted to the object, due to its unrealistic and artificial travel path.

Accordingly, a need will be seen for a directionally controllable fishing lure which produces a curved or arcuate travel path along the surface of the water, with the direction of curvature being selected by the angler. The present lure is laterally asymmetrical, and includes leader attachment means at opposite ends thereof. Depending upon the end of the lure to which the leader or line is attached, the present lure will turn to either the left or the right. This selective turning action enables an angler to place the lure as desired to retrieve it around obstructions as necessary, and also produces a retrieval path which is more attractive to fish due to its more natural action than that produced by a straight line retrieval.

A discussion of the related art of which the present inventor is aware, and its differences and distinctions from the present invention, is provided below.

U.S. Pat. No. 1,239,956 issued on Sep. 11, 1917 to Willis E. Phinney, titled "Artificial Bait," describes a lure with a generally vertically oriented leader attachment plate at its forward end. The plate includes a series of leader attachment holes along its upper and lower edges. Depending upon the hole in which the leader is installed, the Phinney lure will dive or rise in the water. However, the plate is laterally angularly offset as well, thus producing some degree of lateral offset for the leader attachment, depending upon the specific attachment hole used. This will cause the Phinney lure to "wabble" (page 2, line 11) when drawn through the water, according to the Phinney disclosure. However, this lateral movement or "wabble," is not consistent, as is the consistently curved path of the present directionally controllable lure. Moreover, the lateral angular offset of the Phinney leader attachment plate provides a lateral pull in only one direction, and cannot be reversed. The present lure provides two different hydrodynamic faces at opposite ends of the lure, which may be selectively connected to a fishing leader or line for the angler to choose the direction of turn for the lure.

U.S. Pat. No. 1,394,313 issued on Oct. 18, 1921 to Henry T. Leeper, titled "Artificial Bait," describes a lure body having forward and rearward ends sloped respectively forwardly and downwardly and rearwardly and downwardly. Leader attachment eyes are provided at the upper and lower ends of each of these sloped ends. Attachment of the leader to one of the given eyes, results in some predetermined diving reaction as the sloped end deflects downwardly in the water. However, the Leeper lure is laterally symmetrical, and no suggestion is made to apply the angled ends to a laterally asymmetrical lure for causing the lure to turn, as provided by the present invention.

U.S. Pat. No. 1,807,283 issued on May 26, 1931 to Howard J. Dick, titled "Multiple Body Artificial Fish Lure," describes a lure having a single frame configuration into which a variety of different lure bodies may be placed interchangeably. The forward end of the frame includes a downwardly and forwardly sloped face, which is known to cause a lure to dive downwardly as it is drawn through the water, due to hydrodynamic action. However, the lure of the patent to Dick makes no suggestion of any lateral asymmetry to cause the lure to seek a laterally curved path through the water, let alone any means for the angler to select the direction of the curved path, as provided by the present lure invention.

U.S. Pat. No. 2,159,591 issued on May 23, 1939 to V. William Leusch et al., titled "Fishing Lure," describes a lure having leader or line attachment eyes at each end thereof. One end has a downwardly and forwardly inclined plate, while the opposite end has a downwardly and rearwardly inclined concave face. Both ends cause the lure to dive when drawn through the water with the leader attached thereto. However, Leusch et al. state that the two ends produce different lateral movements, depending upon which is forwardmost when moving through the water. Leusch et al. describe a "lateral shifting or whipping of the rear end of the lure body" (page 2, lines 15–16) and a "lateral darting movement" (page 2, lines 30–31), depending upon which end of the lure to which the line is attached, but the Leusch et al. lure is laterally symmetrical, unlike the present lure, and thus cannot sustain a steady, regular, consistently curved path as can the present lure.

U.S. Pat. No. 2,270,488 issued on Jan. 20, 1942 to John M. Withey, titled "Fish Bait," describes a double ended lure having a shallow inverted "V" shape when viewed from the side. Withey states that his lure will dive to a different depth depending upon which end to which the line or leader is attached, as his lure is not symmetrical longitudinally. However, the Withey lure is laterally symmetrical, and no consistent, steady turning motion is provided, as provided by the present lure. Withey only states that the rearward portion of his lure will "swing to and fro horizontally" (page 2, column 1, lines 32–33) as the lure is drawn through the water, in much the same manner as the oscillations described in other patents noted further above.

U.S. Pat. No. 2,274,596 issued on Feb. 24, 1942 to Louis R. Fink, titled "Fishing Plug," describes a lure having a forwardly and downwardly inclined face and forwardly disposed ballast. The resulting action of the lure is to dive downwardly when pulled through the water. As the Fink lure is laterally symmetrical, no lateral movement is provided by its movement through the water, nor does Fink make any statement regarding the possibility of lateral movement with his lure.

U.S. Pat. No. 2,565,205 issued on Aug. 21, 1951 to William W. Culver, titled "Fishing Lure," describes a lure having a truncated cylindrical body with a passage formed concentrically therethrough. The passage is blocked at the front end thereof by a downwardly and forwardly angled plate, and the lower center portion of the body is removed to form a hollow area communicating with the central passage. Culver states that his lure "will dart from one side to the other" (column 1, line 57 to column 2, line 1) when the lure is pulled sharply, yet further states that water entering the lower recess and exiting through the rearward portion of the central passage "will serve to stabilize the lure" (column 2, lines 11–12). In any event, the Culver lure is laterally symmetrical, and Culver does not make any statement to the effect that his lure is capable of making a wide, consistent arcuate path in a predetermined direction selected by the angler, as is the case with the present directionally controllable fishing lure.

U.S. Pat. No. 2,714,779 issued on Aug. 9, 1955 to Glen P. Heiner, titled "Fishing Lure," describes a laterally symmetrical lure body having a forwardly and downwardly inclined front face and a rearwardly and downwardly inclined tail. A plurality of different eyes are provided for the attachment of a fishing line or leader, and/or hooks as desired. The Heiner lure may be drawn through the water in either direction, with Heiner stating that the will have an "oscillating movement (column 2, lines 43–44) when drawn forwardly and will "oscillate, vibrate, or spin" (column 2, lines 46–47) when drawn rearwardly through the water. Due to the laterally symmetrical configuration of the Heiner lure, it cannot provide a uniform, steady curved path in a predetermined direction as selected by the angler, as provided by the present directionally controllable lure, nor does Heiner make any statement or claim to this effect.

U.S. Pat. No. 2,817,181 issued on Dec. 24, 1957 to James C. Bartlett, titled "Fish Lures," describes a lure having a longitudinally cambered body shape with a forwardly and downwardly inclined front face, as in most of the other lures of the related art. Bartlett states that the angled front face of his lure causes the lure to descend through the water, as is the case with the lures of Culver, Heiner, and others discussed further above. Bartlett also states that his lure produces a "peculiar zigzag travel" (column 2, line 5) when drawn through the water, but the laterally symmetrical lure body cannot produce any consistent arcuate path in a direction predetermined by the angler, as provided by the present directionally controllable lure.

U.S. Pat. No. 3,264,775 issued on Aug. 9, 1966 to David J. Nahigian, titled "Fish Lure," describes a solid lure body which moves "from side to side or in a wobbling action" (column 2, line 21). The lure is formed of a relatively flat piece of dense material, and has a flat upper surface and laterally convex curved lower surface. The two ends are truncated at an angle rearwardly from right to left. The right to left orientation holds true, regardless of the end of the lure to which the leader is attached, as the two truncated ends are parallel to one another, unlike the present lure. The lower surface is beveled, to form a relatively narrow forward and rearward edge. As noted above, Nahigian states that his lure wobbles when drawn through the water, rather than following a consistent curved path in a direction as predetermined by the angler, as provided by the present fishing lure.

U.S. Pat. No. 3,507,070 issued on Apr. 21, 1970 to Anthony Rossello, titled "Artificial Fish Lure," describes a generally cylindrical lure body having a concentric passage therethrough. An anchor wire passes laterally through the body and passage, with a fishing line or leader attachment wire secured around the anchor wire. The leader attachment wire can slide laterally or diametrically along the anchor wire, permitting the lure body to move angularly and laterally about the leader attachment wire to an extent limited by the diameter of the interior passage. As the Rossello lure body is axially symmetrical, no consistent difference in hydrodynamic force is applied to one side or the other. Thus, while the Rossello lure may oscillate in the water, it cannot provide a consistent arcuate path in a predetermined direction as selected by the angler, as can the present fishing lure.

U.S. Pat. No. 4,164,826 issued on Aug. 21, 1979 to Phares H. Metzler et al., titled "Salmon Jig," describes a non-buoyant lure having a lateral bend in the body thereof. The Metzler et al. lure is adapted to sink for fishing on or near the bottom, unlike the present buoyant lure. Moreover, Metzler et al. are silent regarding any ability of their lure to travel a predetermined arcuate path, as can the present lure. In fact, Metzler et al. only state that their lure has only a "wobbling action" (column 4, line 27) when drawn through the water. In addition, the Metzler lure, while being laterally asymmetrical, is also longitudinally asymmetrical and has no provision for reversing the fishing line or leader attachment end, as provided by the present fishing lure.

U.S. Pat. No. 4,602,452 issued on Jul. 29, 1986 to Kenneth Reid, titled "Fishing Lure With Angled End Faces And Rotatable On The Line," describes a non-buoyant lure for fishing below the surface. The lure has a slight helical twist and opposite truncated end faces, which produce a rotation about the axis defined by the fishing leader or line attached to the lure. The Reid lure is not longitudinally symmetrical, and Reid states that different rotational rates are achieved at a given speed through the water, depending upon which end of the lure is used as the forwardmost end. However, Reid does not make any statement regarding the ability of his lure to travel in an arcuate path predetermined by the angler, as provided by the present directionally controllable lure, and in fact the rotation of the Reid lure about the line or leader axis would preclude any control over any resulting turning effect.

U.S. Pat. No. 5,537,770 issued on Jul. 23, 1996 to John M. Storm et al., titled "Method And Apparatus For Altering Fishing Lures," describes the selective addition of small weights to the exterior of a fishing lure, for causing the lure to perform in specific ways as it is drawn through the water (e.g., adding weight to the front will cause the lure to dive, etc.). Storm et al. also describe the selective addition of weight to the left or right side of a flat protrusion or "bill" at the front of the lure, and state that such additional weight causes the lure to turn to the left or right (column 5, lines 15–18). However, it appears that the amount or degree of turning action, if any, is highly dependent upon the exterior shape of the lure and its resultant hydrodynamic action. A streamlined body with no lateral planes or protrusions, would appear unlikely to produce any form of turning movement, regardless of the asymmetric addition of weights thereto. Also, the Storm et al. lure is not reversible, as is the present lure. The present directionally controllable lure is much easier to adjust insofar as the direction of travel is concerned, as the angler need only disconnect the swivel snap or other connector from one end of the lure, remove any hook(s) attached to the opposite end, and reverse their connections end to end. Storm et al. note that their method is not easily accomplished, as they describe the need for an angler to experiment with different amounts and locations of weights in order to obtain the desired results.

U.S. Pat. No. 5,638,632 issued on Jun. 17, 1997 to Donald L. Smith, titled "Artificial Fishing Lure," describes a lure having a relatively thin body with a sinusoidal curve along its length. The curve and longitudinal asymmetry result in the Smith lure producing a lateral oscillating action or a rolling action, depending upon the specific shape, ballasting, etc. The curve of the body of the Smith lure causes it to turn in a direction toward the concave curvature, but as the lure is oscillating or rolling in the water, the arcuate path is always changing and cancels out over the long run as the lure is retrieved. In contrast, the present lure is ballasted to maintain a constant orientation and thus a consistent curved path through the water. Also, the Smith lure is not reversible end to end, as provided by the present lure.

British Patent Publication No. 590,865 accepted on Jul. 30, 1947 to Alexander C. Clarke, titled "Improvements In Or Relating To Artificial Baits Or Lures For Fish," describes a ballasted, streamlined lure body having a downwardly and rearwardly turned plate at the rearward end thereof, with a relatively high mounted leader attachment eye at the front. The arrangement causes the lure to produce a "side to side, rolling motion" (page 2, lines 60–61). Clarke is silent regarding any ability of his lure to make any form of consistent, continuous turning path while drawn through the water, as can the present directionally controllable lure. Moreover, the Clarke lure is laterally symmetrical and is not reversible end to end, as is the present lure.

Finally, Canadian Patent Publication No. 677,357 issued on Jan. 7, 1964 to Edgar A. Dorsett, titled "Artificial Fishing Lure," describes a lure having multiple air and water chambers therein. At least one chamber communicates with at least one other chamber, with the chambers progressively filling with water as the lure is jerked through the water. Initially, the Dorsett lure floats, but after a few jerks on the line, the chambers become sufficiently filled with water to cause the lure to sink. However, as the Dorsett lure is laterally symmetrical, no lateral movement is provided, whereas the present directionally controllable lure turns in a consistent, preselected arcuate path when retrieved.

None of the above inventions and patents, taken either singly or in combination, is seen to describe the instant invention as claimed.

SUMMARY OF THE INVENTION

The present invention comprises a directionally controllable buoyant fishing lure which enables an angler to select the desired direction of movement (i.e., to the left or right) as the lure is drawn through the water, by selectively connecting the fishing leader or line to one or the other of the two ends of the lure. The present directionally controllable lure has a buoyant lure body with angularly truncated faces at each of the two ends thereof. The lure is ballasted, in order to have an upper portion which remains constantly upright, and an opposite constantly downwardly disposed bottom portion. The two truncated ends are formed at some non-perpendicular angle to the axis of the lure (preferably about forty five degrees), and thus produce a lateral deflection when the present lure is drawn through the water.

However, the two ends are not parallel to one another, but are angled in opposite directions. The two ends of the lure are reversible, so that the fishing leader or line may be secured to either end as desired. Thus, attachment of the leader or line to the end which is angled forwardly and to the left, will cause the lure to turn to the left (as viewed from the path of the lure) when drawn through the water, with the opposite face being angled in the opposite direction and producing a turn to the right when drawn through the water. The present lure may be formed in various different cross sectional shapes of various materials as desired, so long as its buoyancy is maintained. The end opposite the leader attachment end may be used for the attachment of a hook, if desired.

Accordingly, it is a principal object of the invention to provide an improved directionally controllable fishing lure which turns in a regular, consistent, curved path when drawn through the water by an angler.

It is another object of the invention to provide an improved directionally controllable lure which curved path may be selected to either the left or to the right by the angler, by connecting the fishing leader or line to one or the other of the two ends of the lure.

It is a further object of the invention to provide an improved directionally controllable lure having a ballasted, buoyant lure body which maintains a constant orientation about its longitudinal axis when drawn through the water, and which does not produce any significant rolling action about its longitudinal axis.

An additional object of the invention is to provide an improved directionally controllable lure in which opposite ends have truncated faces, with the faces being angled in opposite directions relative to the direction of movement of the lure through the water, and with the resulting hydrodynamic action upon the forwardly disposed face causing the lure to turn in a predetermined direction, depending upon which end is disposed forwardly.

Still another object of the invention is to provide an improved directionally controllable lure which rearward end may be used for the attachment of a fishing hook thereto, if so desired.

It is an object of the invention to provide improved elements and arrangements thereof in an apparatus for the purposes described which are inexpensive, dependable and fully effective in accomplishing their intended purposes.

These and other objects of the present invention will become apparent upon review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a directionally controllable fishing lure, which travels a steady, regular, and consistently curved path through the water when drawn through the water by an angler. The direction of the turn (i.e., to. the left or to the right) is selected by the angler, by selecting which of the two ends of the lure to which the fishing line or leader is attached.

Figure 1:
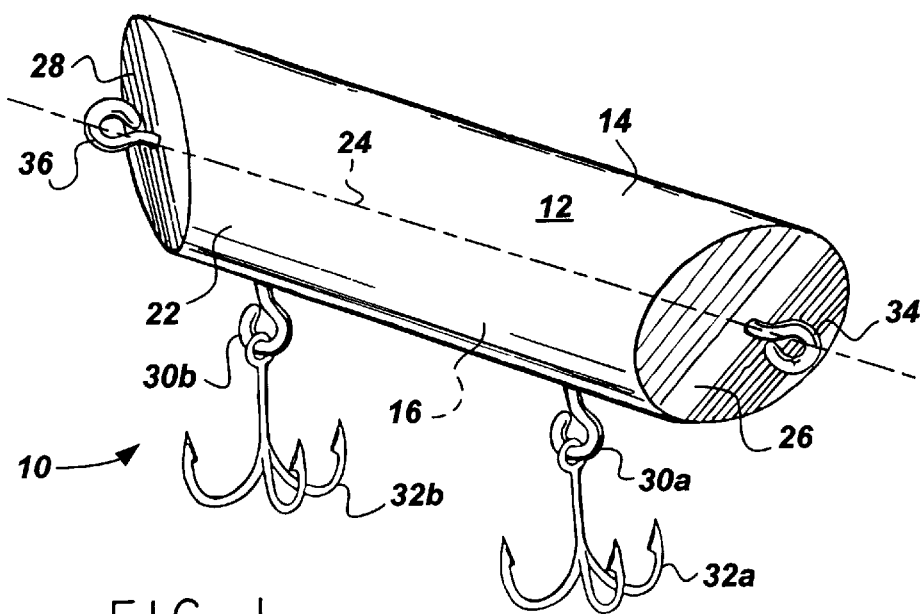
FIG. 1 is a perspective view of the present directionally controllable fishing lure, showing its general configuration.
Figure 2:
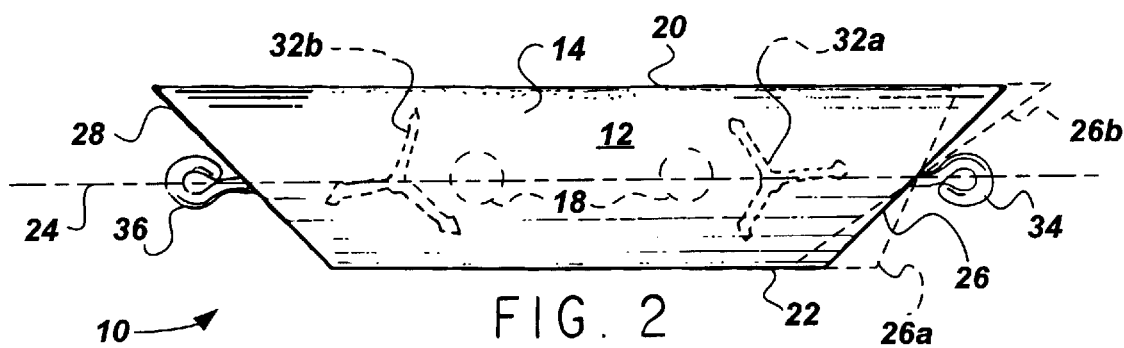
FIG. 2 is a top plan view of the present lure, showing the opposed angles of the truncated faces at each end thereof and alternative angles therefor.
Figure 3:
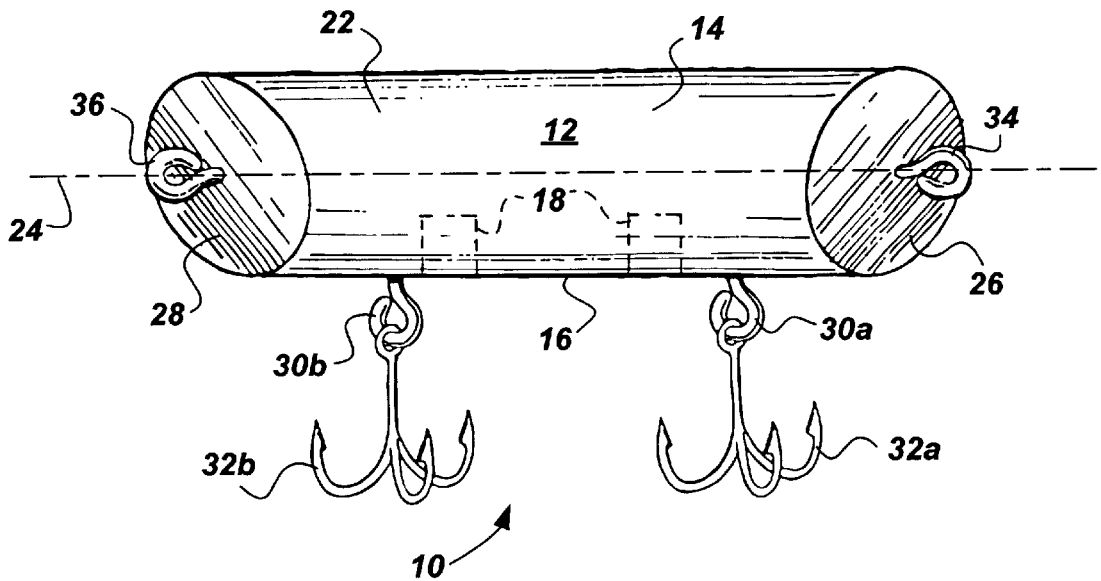
FIG. 3 is a side elevational view of the present lure, showing exemplary ballast locations and other details.
Figure 4C:
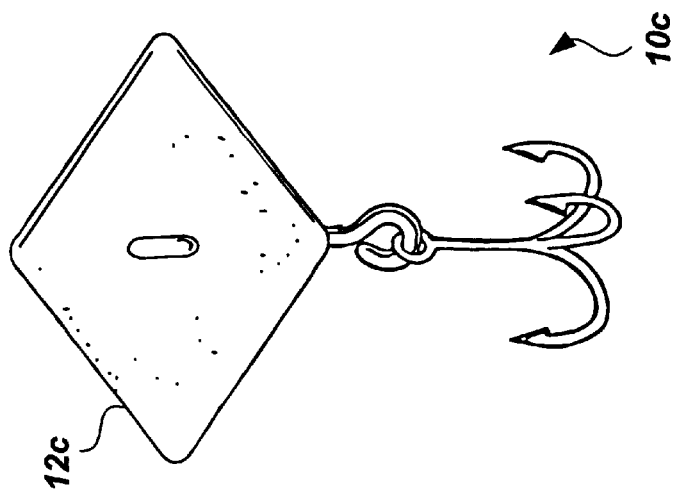
FIGS. 4A through 4C are end views showing alternative embodiments respectively having a rectangular or square cross section, a generally triangular cross section, and a trapezoidal or rhomboid cross section.
Figure 4B:
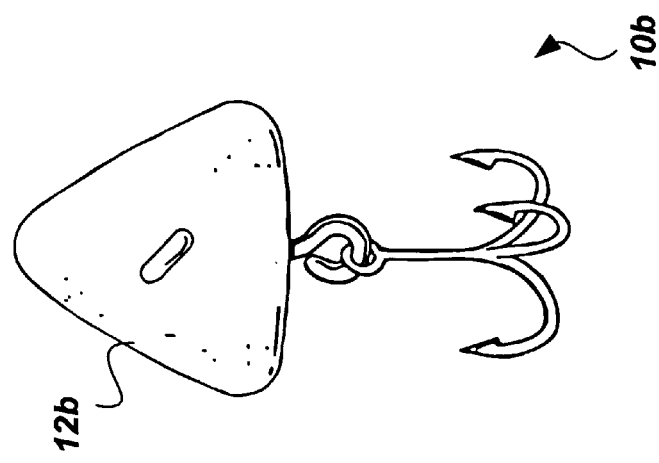
Figure 4A:
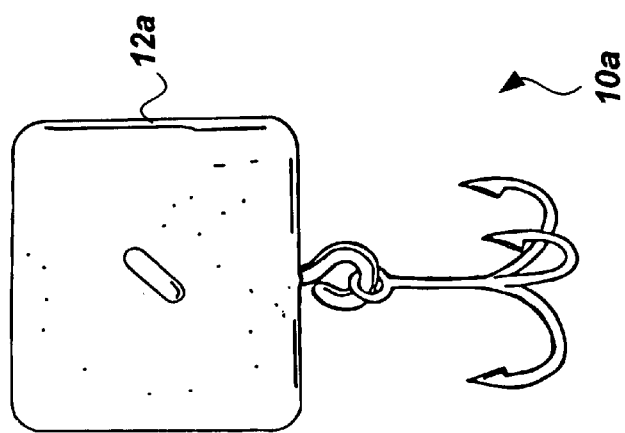

FIGS. 1 through 3 illustrate a first embodiment of the present directionally controllable lure, designated by the reference numeral 10 throughout the drawing Figures. The directionally controllable lure 10 has a lure body 12 with a generally circular cross section, as shown in FIGS. 1 through 3. However, the specific cross sectional shape of the lure body 12 is not critical to the function of the present invention, with FIGS. 4A through 4C respectively illustrating end elevational views of a lure 10a with a body 12a having a substantially rectangular or square cross section, a lure 10b with a body 12b having a substantially triangular cross section, and a lure 10c with a body 12c having a substantially rhomboid or trapezoidal cross section. The corners or of the various shapes 12a through 12c may be rounded, as shown, or may be sharper, as desired. The construction of the present directionally controllable lure is not limited to the specific cross sectional shapes shown in FIGS. 4A through 4C, but may be formed to have a cross sectional shape of virtually any practicable polygonal form as desired.

The elongate lure body 12 of FIGS. 1 through 3 has an upper portion 14 with an opposite lower portion 16 including ballast means therein (e.g., a pair of symmetrically distributed ballast weights 18 of equal weight; other ballast alternatives may be provided as desired). The lure 10 is in its upright orientation in FIG. 3, and essentially so in FIG. 1 of the drawings. The ballast means 18 orients the lure 10 with the lower portion 16 essentially constantly downward and upper portion 18 upward, with the first and second sides 20 and 22 being laterally oriented, during the time the buoyant lure 10 is floating in the water, with the ballast means 18 resisting any substantial tendency for the lure 10 to roll about its longitudinal axis 24 while in the water.

The opposite first and second ends or faces, respectively 26 and 28, of the lure 10 are angularly truncated. The first face 26 is angled toward the second side 22 and opposite second face 28, while the second face 28 is also angled toward the second side 22, but toward its opposite first face 26. Thus, an elevational view of the present lure 10 from its second side 22 clearly shows both of the angularly truncated faces 26 and 28, as shown in FIG. 3 of the drawings. (The terms "left" and "right" are intentionally avoided in this discussion of the lure 10 configuration, as they are relative terms and are inconsistent, depending upon which end of the lure 10 to which the fishing line or leader is attached.) The opposed, rather than parallel, faces 26 and 28 result in a laterally asymmetrical lure body, with the first side 20 being longer than the second side 22.

The two ends 26 and 28 preferably form an angle of substantially forty five degrees with the longitudinal axis 24 of the lure body 12, as shown in FIG. 2 of the drawings. Such a forty five degree angle has been found to produce an optimum arcuate path for the present lure 10. However, other angles of greater than or less than forty five degrees may be provided if so desired, as indicated respectively by the broken line faces 26a and 26b in FIG. 2 of the drawings. It should also be noted that while it is preferred that the two faces 26 and 28 have the same angles relative to the longitudinal axis 24 in order for the lure 10 to provide the same degree of arcuate motion when drawn from either end, this is not required, and the two ends 26 and 28 may have different angles with respect to the longitudinal axis 24, if so desired.

A series of eyelets are provided on the lure body 12, for the attachment of hooks, fishing leaders or lines, etc., as desired. A symmetrically disposed pair of hook attachment eyes 30a and 30b by be secured to the bottom portion 16 of the lure body 12, with a pair of hooks, respectively 32a and 32b, depending therefrom. Other arrangements may be provided as desired, e.g., hook attachment eyes extending from the sides 20 and 22 of the lure body, and/or more or fewer hook attachment eyes, single or double hooks rather than the treble hooks 32a and 32b shown, etc., as desired. The exact arrangement is not critical, but preferably the hook arrangement is symmetrical and complementary to the ballast means 18 so as not to work against the ballast 18.

Each end 26 and 28 of the lure 10 has a fishing line or leader attachment eye, respectively 34 and 36, extending therefrom, preferably in alignment with the longitudinal axis 24 of the lure body 12. These two opposed leader or line attachment eyes 34 and 36 enable the angler to secure the fishing line to either end or face 26 or 28 of the lure 10, as desired. The lure 10 will turn in a predetermined direction depending upon the orientation of the forwardmost end or face 26 or 28, which depends upon which leader attachment eye 34 or 36 is used, as described below and illustrated in the schematic plan views of FIGS. 5A and 5B.

Figure 5A:
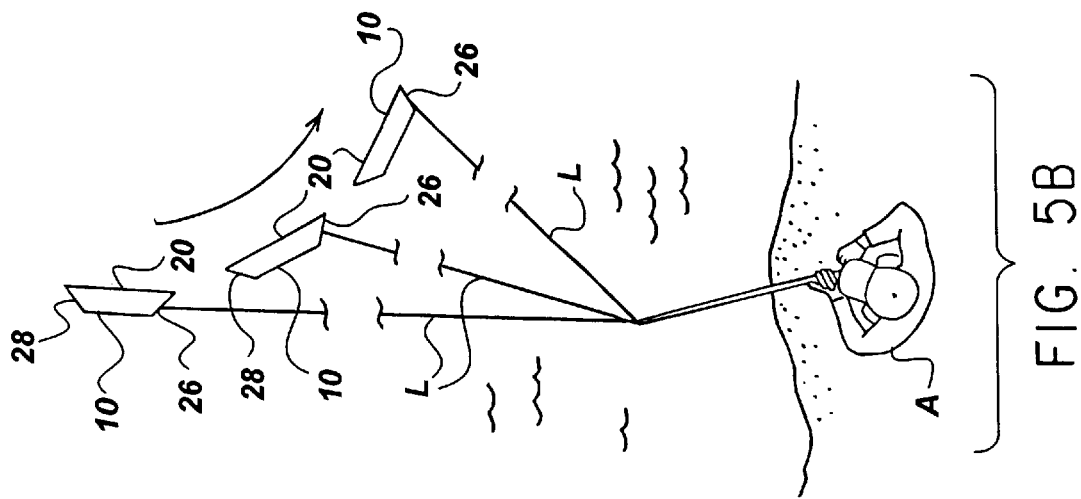
FIGS. 5A and 5B are simplified top plan views, showing arcuate paths of the present lure respectively to the right and to the left (as viewed from the path of the lure) as it is drawn through the water, depending upon which end of the lure to which the fishing line or leader has been secured.

In FIG. 5A of the drawings, an angler A is retrieving the lure 10 after casting the lure 10 outwardly into a body of water. The angler A has attached the fishing line or leader L to the second eye extending from the second end 28 of the lure 10, with that end 28 being oriented forwardly along the path of the lure 10 through the water as the lure is being drawn back to the angler A. This results in the first side 20 of the lure body 12 being oriented to the left relative to the angler A. The angular orientation of the second end 28 of the lure, tapering toward the second side of the lure body 12 with its leading edge toward the right side of the path of travel, results in a hydrodynamic reaction with water deflecting in the opposite direction from the face or end 28, thus resulting in the lure 10 being deflected toward its first side 20, or to the right as viewed along its path of travel through the water. (The travel path is to the left, when viewed from the point of view of the angler A.)

Figure 5B:
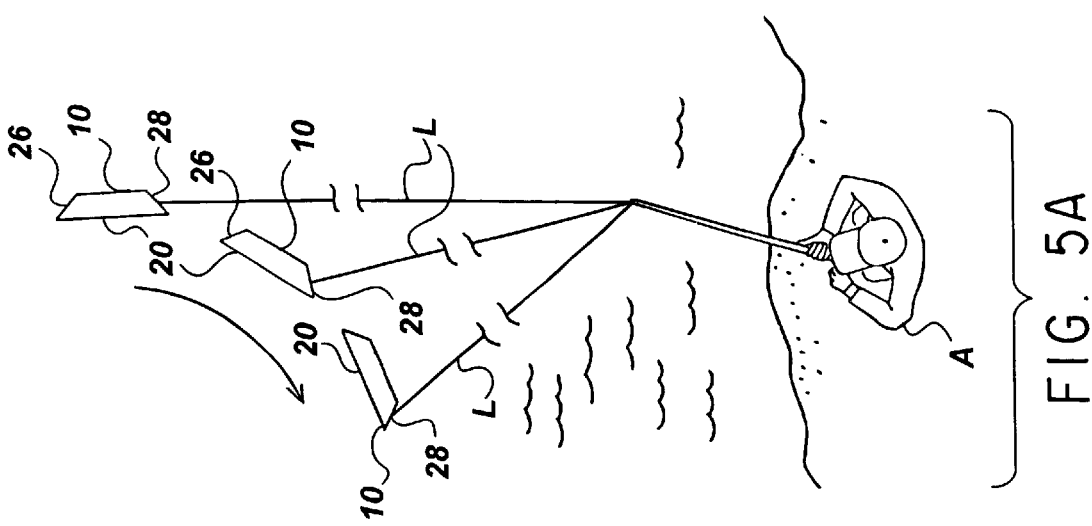

In FIG. 5B, the angler A has attached the line L to the eye extending from the first end 26 of the lure body 12, with the opposite second end 28 becoming the trailing end in this configuration. The lure 10 is cast into the water, with its first end 26 becoming the leading end as the lure 10 is retrieved. This positions the first side 20, toward which the lure 10 will always turn due to the angles of the two faces or ends 26 and 28, toward the right side of the angler A. The result is that the lure 10 will turn to the right (as viewed from the viewpoint of the angler A), or to the left (toward its first side 20) when viewed from the point of view of its direction of travel through the water.

In other words, the selection of the fishing line or lead attachment end of the lure 10 by the angler A, will position one or the other end forwardly along the direction of travel of the lure 10 through the water. As the lure 10 may be oriented in two different directions upon retrieval, depending upon which of the two ends 26 or 28 is being drawn forwardly by the fishing line L, so also will the two sides 20 and 22 be correspondingly oriented to either the left or to the right side of the path of travel of the lure 10 through the water. If the first end 26 is the forwardmost end, then the first side 20 (toward which the lure 10 will always turn) will be oriented to the right of the angler A, as shown in FIG. 5B. If the opposite second end 28 is attached to the fishing line L and is therefore forwardmost, then the first side 20 will be oriented to the left of the angler A as he/she retrieves the lure 10.

In summary, the present directionally controllable fishing lure provides a much needed means for an angler to have control over the direction of travel of a fishing lure. The present lure is simple and does not require any electronic means, presetting of rudders or fins, adjustment of differential weights, etc. Rather, the present directionally controllable lure relies purely upon the principle of hydrodynamic force applied obliquely to one of the two end faces of the lure, with the direction of turn depending upon which of the two faces is connected to the fishing line and thus being drawn forwardly through the water.

The present directionally controllable lure may be formed of many different materials (so long as the desired buoyancy is maintained), such as wood or plastic foam coated with a waterproof material (paint, plastic coating, etc.) or may be formed entirely of a hollow or solid buoyant plastic material, as desired. Additional features or components may be added to the present lure, if so desired. For example, when the first end eyelet is used for the attachment of a fishing line or leader, the opposite second end eyelet is free for the angler to attach other conventional articles thereto (e.g., an additional hook, a skirt, spoon or spinner, etc.). However, in its configuration as illustrated in the drawing Figures, the present directionally controllable lure is devoid of such additional attachments, and is thus longitudinally symmetrical.

When the angler provides a steady pull on the lure, it will produce a steady turn until the hydrodynamic turning force is balanced by the angularly offset pull from the fishing line, whereupon the lure will track at a considerable angle from the fishing line. It will be noted that with some practice, an angler may achieve considerable control over the radius of the retrieve path of the present lure, as well. For example, a relatively rapid pull on the line will accelerate the lure through the water, resulting in a relatively large amount of hydrodynamic force deflecting the lure from a straight path. If the angler relaxes the tension on the line at this point, the momentum of the lure will cause it to continue its arcuate path through the water, without any compensating pull from the fishing line. As a result, the present directionally controllable lure is capable of making a complete circle of relatively small diameter (e.g., on the order of one foot or so) in the water.

Accordingly, the present directionally controllable fishing lure will prove popular for anglers who have occasion to fish in waters restricted by snags, weeds, etc., and have need to work around such obstructions. The present directionally controllable lure enables the angler to cast the lure into an open area beyond such obstructions, and retrieve the lure along an arcuate path around the obstructions without concern for snagging upon such obstructions by a straight retrieve, as would be the case with a conventional fishing lure.

Another benefit of the present lure is its realistic, arcuate path of travel, with the radius of the arcuate path being controllable by the angler to a great extent, as noted further above. The arcuate path of travel provided by the present lure, realistically mimics the path of most prey through the water, as they seldom, if ever, travel in a substantially straight line. As a result, the present lure proves more attractive to fish due to its more realistic action as it travels through the water. The present lure is also valuable when fishing in moving water (tide, river or stream, etc.), as the practiced angler can work the present lure upstream to a certain extent, or at least prevent the lure from drifting downstream. The greater control of the angler over the path of travel of the present lure, will prove exceedingly valuable to the angler who requires precise placement and control of the lure in various conditions.

It is to be understood that the present invention is not limited to the embodiments described above, but encompasses any and all embodiments within the scope of the following claims.

We claim:

1. A directionally controllable fishing lure adapted to float on the surface of a body of water comprising:

a buoyant, laterally asymmetrical, elongate lure body, said lure body having a first end and a second end;

said lure body having a longitudinal axis, an upper portion, a lower portion opposite said upper portion, a first side, and a second side opposite said first side;

ballast means disposed within said lower portion of said lure body, for precluding substantial rolling of said lure body about said longitudinal axis thereof as said lure body floats in the water;

said first end having a truncated face angled toward said second end and said second side and said second end having a truncated face angled toward said first end and said second side wherein said second side is shorter in length than said first side and whereby respective planes formed by each truncated face are perpendicular to a horizontal plane formed by the surface of the water when said lure is afloat;

a first fishing line attachment eye, said first fishing line attachment eye fixed to said first end adjacent said second side;

a second fishing line attachment eye, said second fishing line attachment eye fixed to said second end adjacent said second side; and two fish hooks depending symmetrically from said lower portion of said lure body.

2. The directionally controllable fishing lure according to claim 1, wherein at least one of said faces forms an angle of substantially forty five degrees with said longitudinal axis of said lure body.

3. The directionally controllable fishing lure according to claim 1, wherein at least one of said faces forms an angle greater than forty five degrees with said longitudinal axis of said lure body.

4. The directionally controllable fishing lure according to claim 1, wherein at least one of said faces forms an angle less than forty five degrees with said longitudinal axis of said lure body.

5. The directionally controllable fishing lure according to claim 1, wherein said ballast means comprises two ballast weights symmetrically disposed within said lower portion of said lure body, with said ballast weights being substantially equal in weight to one another.

6. The directionally controllable fishing lure according to claim 1, wherein said lure body has a generally circular cross section.

7. The directionally controllable fishing lure according to claim 1, wherein said lure body has a generally polygonal cross section.

8. The directionally controllable fishing lure according to claim 1, wherein said lure body is formed of wood with a waterproof coating disposed there over.

9. The directionally controllable fishing lure according to claim 1, wherein said lure body is formed of plastic.

* * * * *